(12) United States Patent
Kouzuma et al.

(10) Patent No.: US 10,480,640 B2
(45) Date of Patent: Nov. 19, 2019

(54) POWER TRANSMISSION DEVICE (71) Applicant: HONDA LOCK MFG. CO., LTD., Miyazaki-Shi, Miyazaki (JP)

(72) Inventors: Hiroyuki Kouzuma, Miyazaki (JP); Kohei Hirotani, Miyazaki (JP)

(73) Assignee: Honda Lock Mfg. Co., Ltd., Miyazaki (JP)

( * ) Notice: Subject to any disclaimer, the term of this patent is extended or adjusted under 35 U.S.C. 154(b) by 0 days.

(21) Appl. No.: 15/543,089

(22) PCT Filed: Mar. 2, 2016

(86) PCT No.: PCT/JP2016/056382
§ 371 (c)(1),
(2) Date: Jul. 12, 2017

(87) PCT Pub. No.: WO2016/140249
PCT Pub. Date: Sep. 9, 2016

(65) Prior Publication Data
US 2018/0010683 A1 Jan. 11, 2018

(30) Foreign Application Priority Data

Mar. 4, 2015 (JP) .................. 2015-042301

(51) Int. Cl.
*F16H 57/12* (2006.01)
*G05G 1/46* (2008.04)
(Continued)

(52) U.S. Cl.
CPC ........... *F16H 57/12* (2013.01); *B60K 26/021* (2013.01); *F16H 1/16* (2013.01); *G05G 1/46* (2013.01);
(Continued)

(58) Field of Classification Search
CPC .. F16H 2057/0221; F16H 55/14; F16H 55/22; F16H 55/24; F16H 2057/0213;
(Continued)

(56) References Cited

U.S. PATENT DOCUMENTS

RE26,356 E * 3/1968 Pickles .................. F16D 3/66
74/411
4,979,603 A * 12/1990 Wheatland ............. A01B 61/00
192/150
(Continued)

FOREIGN PATENT DOCUMENTS

CN 101204929 A 6/2008
JP 52156873 * 11/1977
(Continued)

OTHER PUBLICATIONS

PCT/ISA/210 from PCT/JP2016/056382 with the English translation thereof.
(Continued)

*Primary Examiner* — Victor L MacArthur
*Assistant Examiner* — Bobby Rushing, Jr.
(74) *Attorney, Agent, or Firm* — Carrier Blackman & Associates, P.C.; Joseph P. Carrier; Fulchand P. Shende (57) ABSTRACT This power transmission device includes a motor, a worm connected to a rotating shaft of the motor, and a worm wheel engaged with the worm and disposed at an operation pedal side with respect to the worm, wherein a biasing member which biases the motor in a direction in which the worm and the worm wheel come in contact with each other when the motor is driven is disposed between the motor and a housing.

4 Claims, 8 Drawing Sheets (51) Int. Cl.
*F16H 1/16* (2006.01)
*B60K 26/02* (2006.01)

(52) U.S. Cl.
CPC .. *B60K 2026/023* (2013.01); *F16H 2057/127* (2013.01)

(58) Field of Classification Search
CPC ............... F16H 57/039; B60K 26/021; B60K 2026/023; B60K 2026/026; G05G 1/46
USPC ............................. 74/89.14, 409, 425, 724
See application file for complete search history.

(56) References Cited

U.S. PATENT DOCUMENTS

| | | | | |
|---|---|---|---|---|
| 5,169,245 | A * | 12/1992 | Harada | F16C 17/08 384/218 |
| 5,212,999 | A * | 5/1993 | Kitada | B60S 1/08 384/223 |
| 5,886,437 | A * | 3/1999 | Bohn | B60S 1/16 310/83 |
| 6,900,564 | B2 * | 5/2005 | Kobayashi | B62D 5/0409 180/444 |
| 8,701,522 | B2 * | 4/2014 | Kim | F02D 11/02 74/512 |
| 9,464,464 | B2 * | 10/2016 | Rajagopal | E05B 81/06 |
| 2008/0141820 | A1 | 6/2008 | Park et al. | |
| 2010/0083789 | A1 * | 4/2010 | Osawa | B60K 26/02 74/513 |
| 2011/0132134 | A1 | 6/2011 | Kim et al. | |
| 2013/0061523 | A1 * | 3/2013 | Mankame | B60J 7/022 49/26 |
| 2013/0152725 | A1 | 6/2013 | Maruyama et al. | |
| 2014/0190288 | A1 * | 7/2014 | Figura | B62D 3/04 74/89.14 |
| 2015/0075899 | A1 * | 3/2015 | Kikuchi | B62D 5/0409 180/444 |

FOREIGN PATENT DOCUMENTS

| | | | | |
|---|---|---|---|---|
| JP | 59166870 A | * | 9/1984 | F16H 1/16 |
| JP | 4-40047 U | | 4/1992 | |
| JP | 2004-354874 | * | 12/2004 | G02B 7/04 |
| JP | 2008-152750 A | | 7/2008 | |
| JP | 2010-111379 A | | 5/2010 | |
| JP | 2012253946 A | * | 12/2012 | |
| JP | 2013-169918 A | | 9/2013 | |
| JP | 2014-078174 A | | 5/2014 | |
| WO | 2012/029503 A1 | | 3/2012 | |
| WO | WO-2014163128 A1 | * | 10/2014 | B60K 35/00 |

OTHER PUBLICATIONS

Office Action with Search Report issued in the corresponding Chinese Patent Application No. 201680009274.4 dated Dec. 5, 2018, and partial English translation of the Search Report.
Extended European Search Report, dated Oct. 4, 2018, issued in the corresponding EP Patent Application 16758942.3.

* cited by examiner

POWER TRANSMISSION DEVICE

TECHNICAL FIELD

The present invention relates to a power transmission device.

Priority is claimed on Japanese Patent Application No. 2015-042301 filed Mar. 4, 2015, the content of which is incorporated herein by reference.

BACKGROUND ART

A reaction force output device which applies a reaction force corresponding to a depressed state of an accelerator pedal to an accelerator pedal to suppress application of more depression of the accelerator pedal than necessary when a vehicle starts or runs is known as one of power transmission devices (for example, referring to the following Patent Literature 1).

In an accelerator pedal apparatus disclosed in Patent Literature 1, a return spring for returning an accelerator pedal to an initial position, a motor for generating a reaction force and a transmission lever for transmitting rotation of the motor to the accelerator pedal are built in a housing which rotatably supports a base end of the accelerator pedal. In the accelerator pedal apparatus, the motor is controlled by a driving force corresponding to a depressed state of an accelerator pedal, and the driving force is applied to the accelerator pedal through the transmission lever.

CITATION LIST

Patent Literature

[Patent Literature 1]
Japanese Unexamined Patent Application, First Publication No. 2010-111379

SUMMARY OF INVENTION

Technical Problem

However, recently, the above-described reaction force output device was based on studies on connecting the motor and the transmission lever by a worm reduction gear to thereby realize a compact and thin size and a high reduction ratio. Specifically, the worm reduction gear includes a worm which is connected to a rotating shaft of the motor and a worm wheel which is engaged with the worm.

Here, there is backlash at engagement portions of the worm and worm wheel to smoothly rotate the worm reduction gear. In this case, when the reaction force is controlled (when the motor is driven), the worm and the worm wheel integrally rotate in a return direction of an accelerator pedal in a state in which the backlash on a feed side of the worm is filled (a state in which the engagement portions of the worm and the worm wheel are in contact with each other). Meanwhile, even when the motor is stopped and the accelerator pedal is returned to the initial position by a restoring force of the return spring, the worm wheel rotates with respect to the worm in the return direction of the accelerator pedal. Therefore, the backlash is formed on the feed side of the worm of the engagement portions of the worm and the worm wheel.

Additionally, when the accelerator pedal is depressed in a state in which the backlash is formed on the feed side of the worm, the worm wheel rotates with respect to the worm in a depression direction of the accelerator pedal (rotates in a direction opposite to the return direction).

At this time, the backlash formed on the feed side of the worm is filled, and the engagement portions of the worm wheel and the worm come in contact with each other, and thus collision noise between the worm wheel and the worm may be generated.

In addition, when the above-described reaction force control is performed in a state in which the backlash is formed on the feed side of the worm, the backlash is filled, and the engagement portions of the worm and the worm wheel are in contact with each other, and then the worm and the worm wheel rotate integrally as described above. Accordingly, there is room for improvement in enhancing responsiveness of the reaction force control.

An aspect of the present invention has been made in view of such circumstances, and an object of the present invention is to provide a power transmission device capable of realizing a compact and thin size and a high reduction ratio, suppressing generation of a collision noise and also enhancing responsiveness.

Solution to Problem

In order to achieve the aforementioned objects, the present invention adopts the following aspects.

(1) A power transmission device according to one aspect of the present invention which transmits power to an operation portion includes a motor, a worm connected to a rotating shaft of the motor, and a worm wheel engaged with the worm and disposed at an operation portion side with respect to the worm, wherein a biasing member which biases one side of a worm wheel side and a worm side in a direction in which the worm and the worm wheel come in contact with each other when the motor is driven is disposed at at least the one side with respect to engagement portions of the worm and the worm wheel.

According to the above-described aspect (1), when the motor is rotated, a driving force thereof is transmitted to the operation portion via the worm and the worm wheel, and thus the operation portion may be operated (e.g., a reaction force may be controlled).

Meanwhile, when a rotational force is input from the operation portion to the worm wheel while the motor is stopped, the worm wheel rotates with respect to the worm. At this time, at least one side of the worm wheel side and the worm side follows the rotation of the worm wheel and is biased by the biasing member in the direction (toward a feed side of the worm) in which the worm and the worm wheel come in contact with each other when the motor is driven. Accordingly, the backlash formed at the feed side of the worm is filled, and tooth portions at engagement portions of the worm and the worm wheel are always close to each other or in contact with each other.

As described above, since the tooth portions are maintained in a state in which they are close to each other or in contact with each other, generation of collision noise between the worm and the worm wheel can be suppressed.

Also, since the worm and the worm wheel are promptly engaged with each other when the motor is driven, responsiveness of the power transmission device can be enhanced.

Also, according to the aspect (1), since a deceleration mechanism including the worm and the worm wheel is disposed between the motor and the operation portion, it is possible to realize a compact and thin size in a direction orthogonal to the rotating shaft of the motor and a high reduction ratio as compared with a case in which a deceleration mechanism including, for example, a spur gear or the like is used.

(2) In the above-described aspect (1), the power transmission device may further include a power transmission part disposed between the worm wheel and the operation portion to bias the operation portion toward an initial position, and a clutch mechanism configured to allow the worm wheel and the power transmission part to be in a connected state when the motor is driven and also to allow the worm wheel and the power transmission part to be in a disconnected state when the motor is stopped and the operation portion is returned by a biasing force of the power transmission part.

In the case of the aspect (2), since the clutch mechanism is provided between the power transmission part and the worm wheel, the power transmission part idles with respect to the worm wheel when the operation portion is returned. Accordingly, when the motor is stopped and the operation portion is returned by a biasing force of the power transmission part, it is not easily affected by rotational friction of the motor side. Further, since a rotation amount of the worm wheel can be minimized, the backlash can be suppressed from being formed on the feed side of the worm.

(3) In the above-described aspect (1) or (2), the biasing member may be interposed between the motor and a housing in which the motor is accommodated.

In the case of the aspect (3), since the biasing member is interposed between the motor and the housing, simplification can be achieved.

Advantageous Effects of Invention

According to an aspect of the present invention, it is possible to realize a compact and thin size and a high reduction ratio, to suppress generation of a collision noise and also to improve responsiveness.

DESCRIPTION OF EMBODIMENTS

Next, preferred embodiments of the present invention will be described with reference to the accompanying drawings.

In the following description, a case in which a power transmission device of the present invention is applied to a reaction force output device installed on an accelerator pedal apparatus of a vehicle will be described.

[Accelerator Pedal Apparatus]

Figure 1:
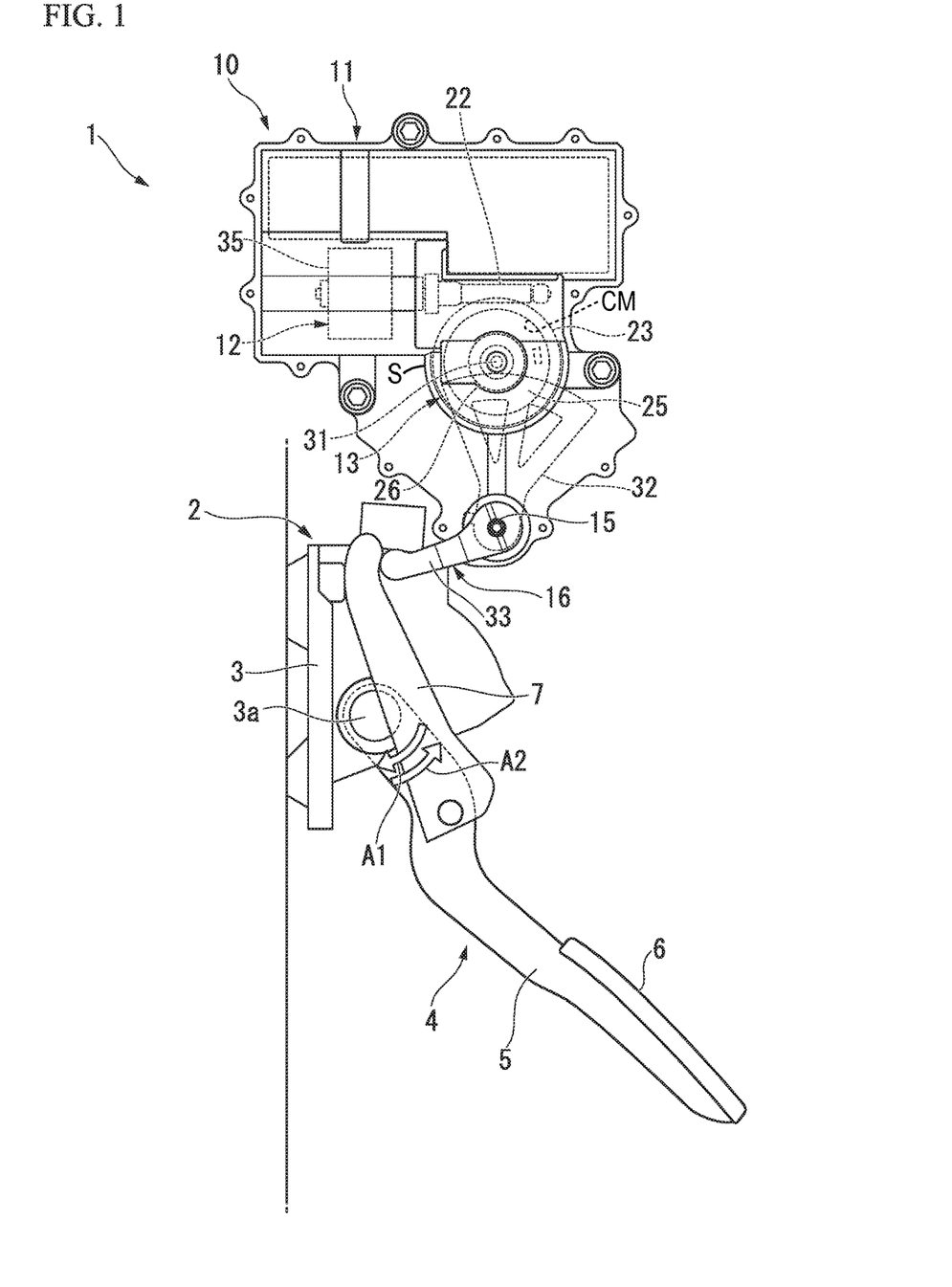
FIG. 1 is a side view of an accelerator pedal apparatus of one embodiment.

FIG. 1 is a side view of an accelerator pedal apparatus 1.

An accelerator pedal apparatus 1 includes a pedal unit 2 which is installed in a foot area of a driver's seat and a reaction force output device (a power transmission device) 10 which is connected to the pedal unit 2.

<Pedal Unit>

The pedal unit 2 includes a holding base 3 which is installed on a vehicle body and an operation pedal (an operation portion) 4 which is rotatably connected to a support shaft 3a provided on the holding base 3.

A return spring which biases the operation pedal 4 toward an initial position thereof and is not illustrated in the drawing is interposed between the holding base 3 and the operation pedal 4.

The operation pedal 4 includes a pedal arm 5 of which a base end is supported in the form of a cantilever by the above-mentioned support shaft 3a, a pedal portion 6 which is provided at a tip end of the pedal arm 5 to be depressed by a driver, and a reaction force transmission lever 7 which is connected to the base end of the pedal arm 5.

A cable which is not illustrated in the drawing and serves to operate an opening degree of a throttle valve of an internal combustion engine which is not illustrated according to an operation amount (a rotation angle) of the pedal arm 5 is connected to the operation pedal 4. However, when the internal combustion engine employs an electronically controlled throttle, a rotation sensor for sensing the rotation angle of the pedal arm 5 may be provided at the pedal unit 2, and the opening degree of the throttle valve may be controlled on the basis of a sensing signal of the rotation sensor.

The reaction force transmission lever 7 extends in a direction approximately opposite to an extension direction of the pedal arm 5 and rotates integrally with the pedal arm 5. Specifically, a base end of the reaction force transmission lever 7 is connected to the base end of the pedal arm 5, and a tip end thereof is connected to an output lever 33 of the reaction force output device 10 which will be described later.

<Reaction Force Output Device>

Figure 2:
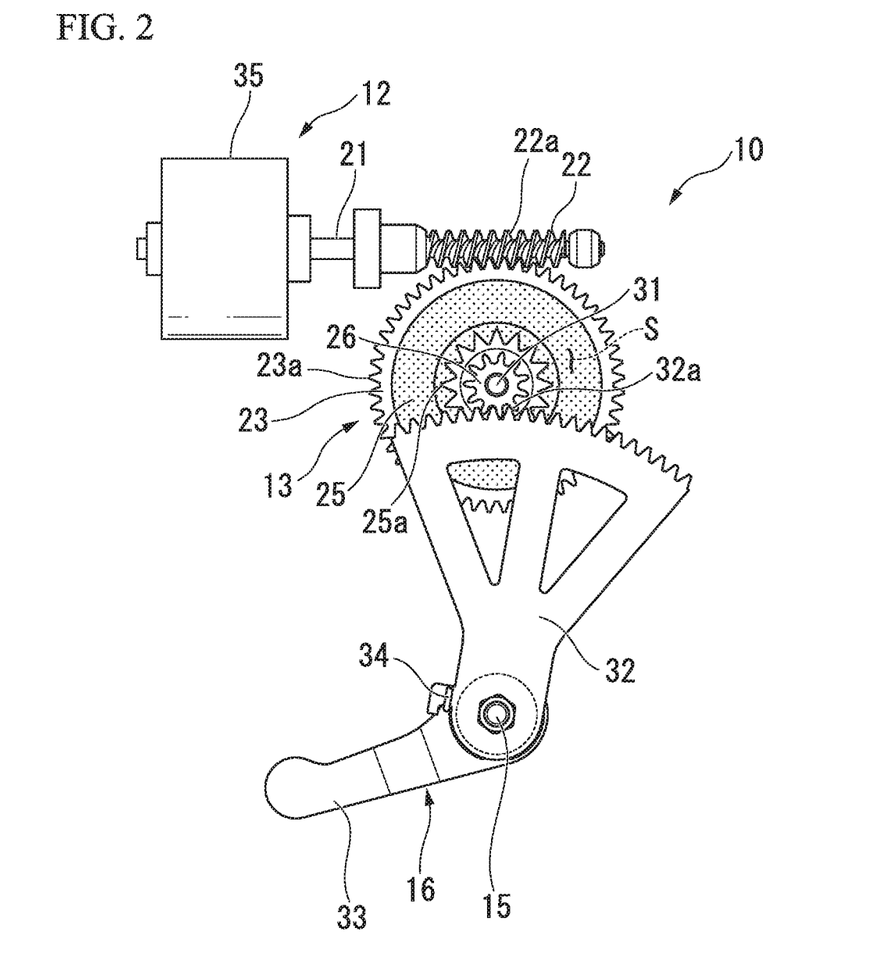
FIG. 2 is a view illustrating a state in which a housing is removed from a reaction force output device.

FIG. 2 is a view illustrating a state in which a housing 11 is removed from a reaction force output device 10.

As illustrated in FIG. 2, the reaction force output device 10 includes a motor 12, a deceleration mechanism 13 for decelerating a driving force of the motor 12, a reaction force output part (a power transmission part) 16 having an output shaft 15 for outputting the driving force of the motor 12 toward the operation pedal 4, and a housing 11 (referring to FIG. 1) which accommodates all of the above-described components. That is, the reaction force output device 10 of the embodiment decelerates the driving force of the motor 12 by the deceleration mechanism 13, and then applies the reaction force to the operation pedal 4 through the reaction force output part 16. Also, the output shaft 15 extends in a direction orthogonal to a rotating shaft 21 of the motor 12 and in parallel with the above-mentioned support shaft 3a. Further, in the following description, a direction along the rotating shaft 21 of the motor 12 may be referred to as a rotating shaft direction, and a direction along the output shaft 15 may be referred to as an output shaft direction.

The deceleration mechanism 13 includes a worm 22 which is connected to the rotating shaft 21 of the motor 12, a worm wheel 23 which is engaged with the worm 22, and a pinion gear 25 which is connected to the worm wheel 23 via a clutch mechanism CM.

The worm 22 extends in the rotating shaft direction and also has a spiral tooth portion 22a formed on an outer circumferential surface thereof.

The worm wheel 23 has a bottomed cylindrical shape and is rotatably supported by a support pin 31 erected from the housing 11. A tooth portion 23a with which the tooth portion 22a of the worm 22 is engaged is formed on an outer circumferential surface of the cylindrical portion of the worm wheel 23. Further, the support pin 31 extends in parallel with the output shaft 15.

The pinion gear 25 has a bottomed cylindrical shape and is rotatably supported by the above-described support pin 31. In the embodiment, the pinion gear 25 is accommodated in the cylindrical portion of the worm wheel 23 to be coaxial with the worm wheel 23 and rotatable with respect to the worm wheel 23. A boss portion 26 protruding outward in the output shaft direction (toward a side opposite to the worm wheel 23) is formed at the bottom of the pinion gear 25, and a tooth portion 25a is formed on an outer circumferential surface of the boss portion 26.

The reaction force output part 16 includes the output shaft 15 which is rotatably supported by the housing 11, a sector gear 32 which is fixed to the output shaft 15 and also engaged with the pinion gear 25, and an output lever 33 which is fixed to the output shaft 15 and connected to the reaction force transmission lever 7.

The output shaft 15 is provided to pass through the housing 11, and one end thereof in the output shaft direction protrudes from the housing 11.

The sector gear 32 has a fan shape in a plane view seen in the output shaft direction, and a tooth portion 32a which is engaged with the tooth portion 25a of the pinion gear 25 is formed on an outer circumferential edge of the sector gear 32. The sector gear 32 is accommodated in the housing 11 and fixed to a portion of the output shaft 15 located inside the housing 11. A coil spring 34 for biasing the reaction force output part 16 toward an initial position is interposed between the sector gear 32 and the housing 11.

A base end of the output lever 33 is fixed to one end (a portion protruding from the housing 11) of the output shaft 15 to be rotatable together with the sector gear 32. A tip end of the output lever 33 can come into contact with a tip end of the reaction force transmission lever 7 of the operation pedal 4 in a rotation direction. In this case, the output lever 33 and the reaction force transmission lever 7 come into contact with each other when the operation pedal 4 is depressed by a driver. Further, the output lever 33 and the reaction force transmission lever 7 may be formed to always be in contact with each other.

The clutch mechanism CM serves to switch transmission and interruption of the driving force between the motor 12 and the reaction force output part 16 and is disposed in a clutch accommodating portion S which is defined between the worm wheel 23 and the pinion gear 25. The clutch mechanism CM allows the worm wheel 23 and the pinion gear 25 to be in a connected state when the motor 12 is driven and when the motor 12 is stopped and the operation pedal 4 is depressed. As a result, a rotational force is transmitted between the worm wheel 23 and the pinion gear 25. Meanwhile, the clutch mechanism CM allows the worm wheel 23 and the pinion gear 25 to be in a disconnected state when the motor 12 is stopped and the reaction force output part 16 is returned to the initial position by the coil spring 34 (when the operation pedal 4 is returned to the initial position). Accordingly, the transmission of the rotational force between the worm wheel 23 and the pinion gear 25 is interrupted.

Figure 3:
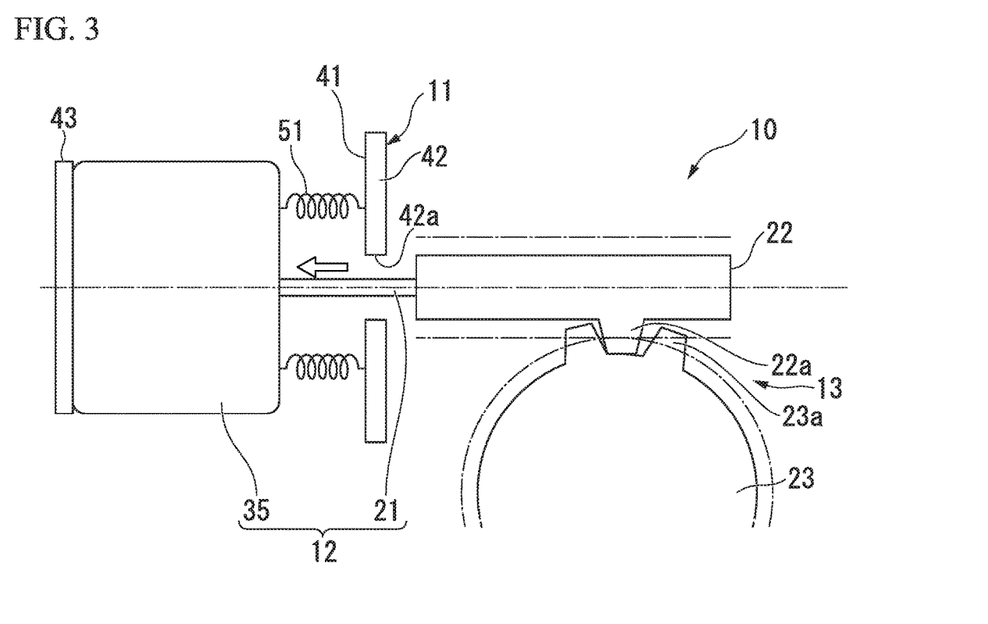
FIG. 3 is a schematic view illustrating a constitution around a motor in the reaction force output device.

FIG. 3 is a schematic view illustrating a constitution around the motor 12 in the reaction force output device 10.

As illustrated in FIG. 3, the above-described motor 12 includes a motor case 35 which accommodates a rotor and a stator that are not illustrated, and the rotating shaft 21 which is fixed to the rotor and protrudes from the motor case 35.

The motor case 35 is accommodated in a motor accommodating portion 41 which is defined in the housing 11. A first restriction wall 42 and a second restriction wall 43 which restrict movement of the motor 12 with respect to the housing 11 in the rotating shaft direction are provided at portions of the motor accommodating portion 41 which are located on both sides in the rotating shaft direction with respect to the motor case 35.

The first restriction wall 42 is located on one end side in the rotating shaft direction with respect to the motor case 35 and has a slit 42a through which a protruding portion of the rotating shaft 21 passes.

The second restriction wall 43 is located on the other end side in the rotating shaft direction with respect to the motor case 35, and the motor case 35 is close thereto or in contact therewith from the one end side in the rotating shaft direction.

Here, a biasing member 51 which biases the motor 12 in a direction in which the motor case 35 is separated from the first restriction wall 42 is interposed between the first restriction wall 42 and the motor case 35.

In the embodiment, the biasing member 51 is, for example, a coil spring of which one end is connected to the first restriction wall 42 and the other end is connected to one end surface of the motor case 35 in the rotating shaft direction. In this case, the biasing member 51 biases the motor 12 toward the feed side of the worm 22 (a direction in which the tooth portions 22a and 23a of the worm 22 and the worm wheel 23 come in contact with each other) when the motor 12 is driven. Therefore, the worm 22 and the worm wheel 23 are in a state in which the backlash on the feed side of the worm 22 in the engagement portions is filled and the tooth portions 22a and 23a are always in contact with each other.

[Action]

Next, an action of the above-described accelerator pedal apparatus 1 will be described.

<When Pedal is Depressed>

Figure 4:
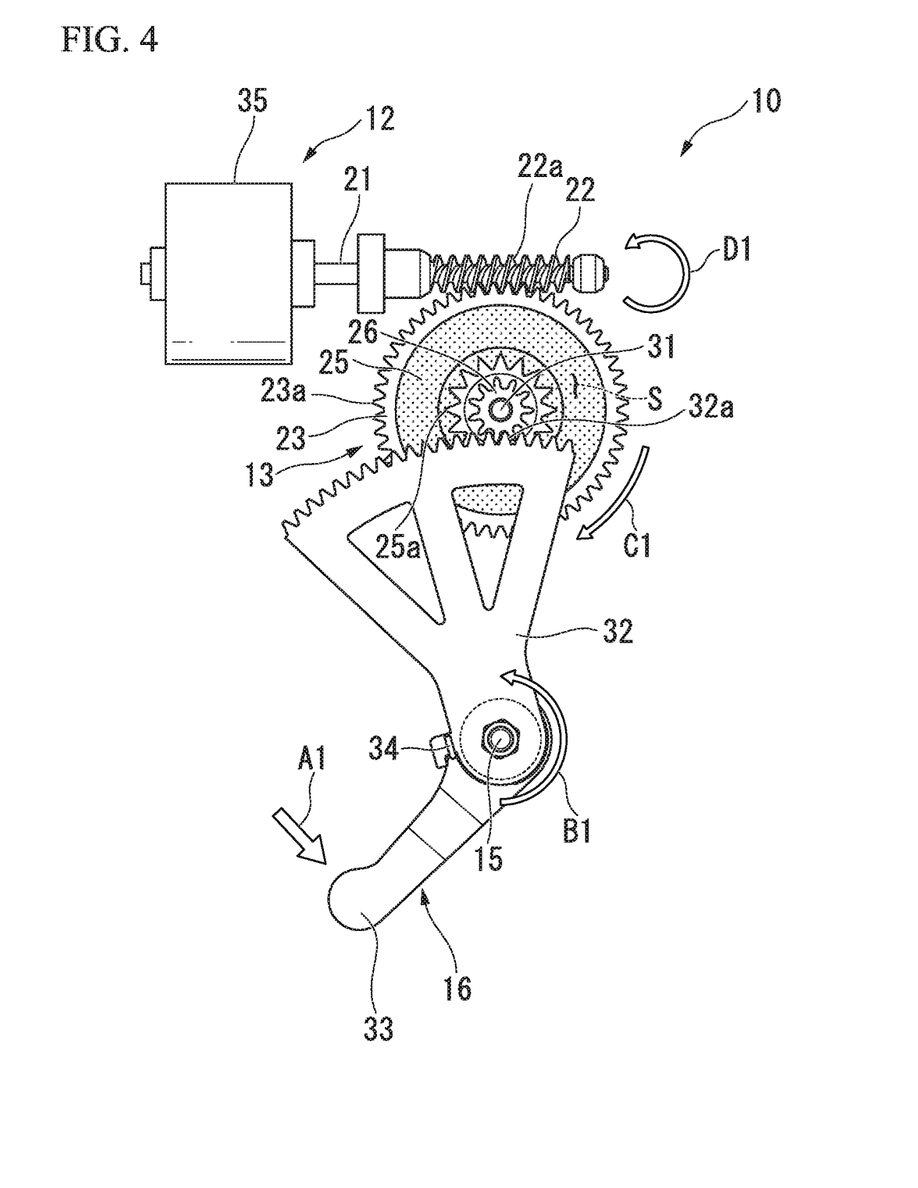
FIG. 4 is an explanatory diagram illustrating an action when an operation pedal is depressed and is a view corresponding to FIG. 2.

FIG. 4 is an explanatory diagram illustrating an action when the operation pedal 4 is depressed and is a view corresponding to FIG. 2.

As illustrated in FIG. 4, when the operation pedal 4 is depressed by the driver, the operation pedal 4 rotates from the initial position in a depression direction A1 (FIG. 1) around the support shaft 3a, and the opening degree of the throttle valve of the internal combustion engine is controlled according to a rotation angle thereof. When the operation pedal 4 rotates in the depression direction A1, the reaction force transmission lever 7 comes in contact with the output lever 33 of the reaction force output part 16 and rotates the reaction force output part 16 in a depression direction B1 (FIG. 4) around the output shaft 15.

When the reaction force output part 16 rotates, a rotational force thereof is transmitted to the pinion gear 25 via the sector gear 32 of the reaction force output part 16, and the pinion gear 25 rotates in a depression direction C1 around the support pin 31. Here, when the operation pedal 4 is depressed, the clutch mechanism CM allows the worm wheel 23 and the pinion gear 25 to be in the connected state, and thus the rotational force of the pinion gear 25 is transmitted to the worm wheel 23 via the clutch mechanism CM. As a result, the worm wheel 23 rotates together with the pinion gear 25 in the depression direction C1.

Additionally, since the rotational force of the worm wheel 23 is transmitted to the rotating shaft 21 via the worm 22, the worm 22 and the rotating shaft 21 rotate in a depression direction D1 (a direction opposite to the rotation direction of the motor 12).

<When Reaction Force is Controlled>

Figure 5:
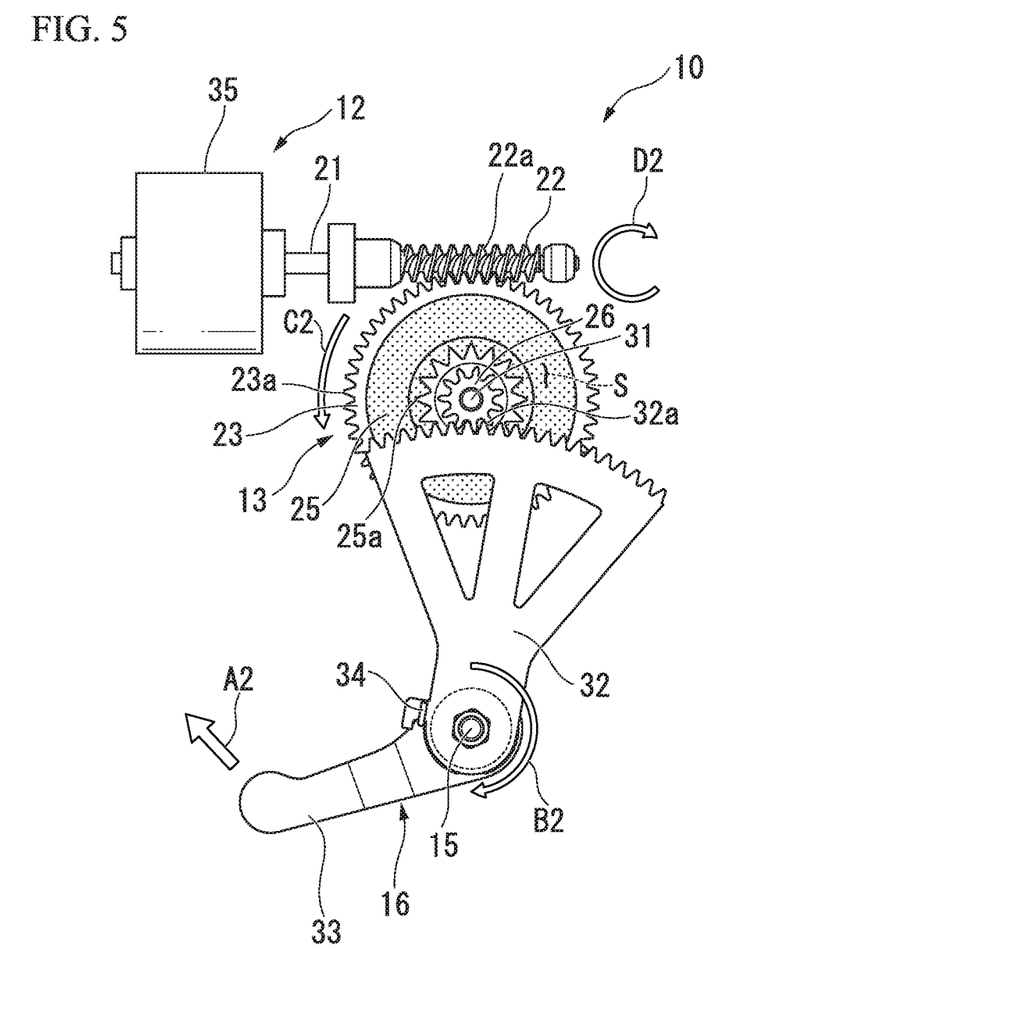
FIG. 5 is an explanatory diagram illustrating an action when a reaction force of the operation pedal is controlled and is a view corresponding to FIG. 2.

FIG. 5 is an explanatory diagram illustrating an action when the reaction force of the operation pedal 4 is controlled and is a view corresponding to FIG. 2.

When it is determined that the above-described depression is excessive according to a depression speed of the operation pedal 4 and a driving situation of a vehicle, reaction force control performed by the reaction force output device 10 starts. Specifically, as illustrated in FIG. 5, the motor 12 of the reaction force output device 10 is driven, and the rotating shaft 21 rotates in a return direction D2 (a forward rotation direction of the motor 12). Then, the driving force of the motor 12 is transmitted to the worm wheel 23 via the worm 22, and the worm wheel 23 rotates in a return direction C2 around the support pin 31. Here, when the motor 12 is driven, the clutch mechanism CM allows the worm wheel 23 and the pinion gear 25 to be in the connected state, and thus a rotational force of the worm wheel 23 is transmitted to the pinion gear 25 via the clutch mechanism CM. As a result, the pinion gear 25 rotates together with the worm wheel 23 in a return direction C2.

Additionally, a rotational force of the pinion gear 25 is transmitted to the reaction force output part 16 via the sector gear 32, and thus the reaction force output part 16 rotates in a return direction B2 around the output shaft 15. When the reaction force output part 16 rotates in the return direction B2, a rotational force thereof is transmitted to the reaction force transmission lever 7 of the operation pedal 4 via the output lever 33. Additionally, a rotational force in a return direction A2 is transmitted to the operation pedal 4 via the reaction force transmission lever 7. At this time, a driving force according to the depression speed of the operation pedal 4 and the driving situation of the vehicle is applied as the reaction force from the reaction force output device 10 to the operation pedal 4. Accordingly, information such as an accelerating state of the internal combustion engine and the "excessive depression" is transmitted to the driver through the sole of his/her foot depressing the pedal portion 6.

Figure 6:
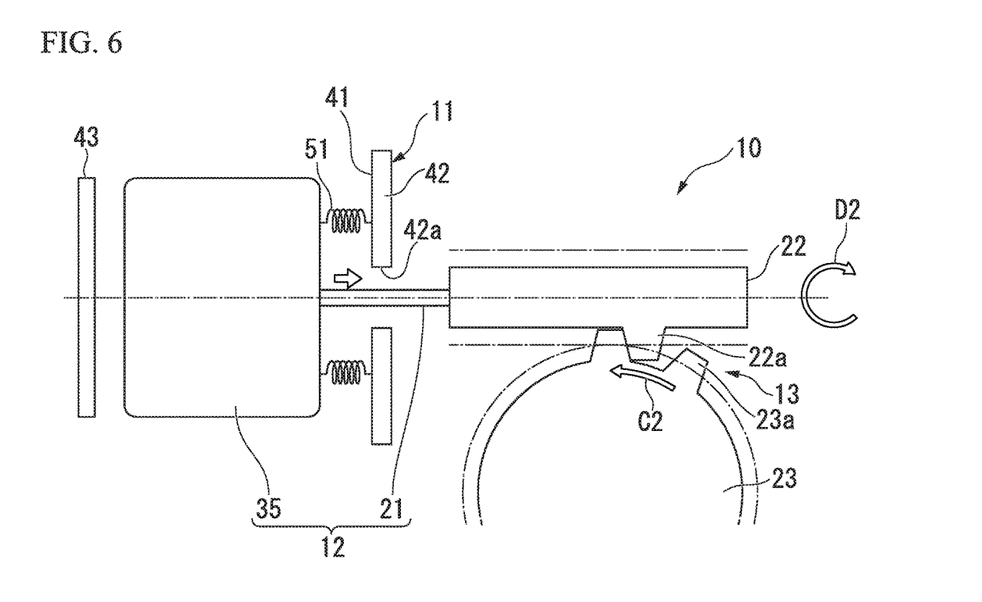
FIG. 6 is an explanatory diagram illustrating the action when the reaction force of the operation pedal is controlled and is a view corresponding to FIG. 3.

FIG. 6 is an explanatory diagram illustrating the action when the reaction force of the operation pedal 4 is controlled and is a view corresponding to FIG. 3.

Further, as illustrated in FIG. 6, when the reaction force is controlled as described above, a thrust load acts on the engagement portions of the worm 22 and the worm wheel 23, and thus the motor 12 moves in a direction against a biasing force of the biasing member 51 (toward the first restriction wall 42).

<When Pedal is Returned>

Figure 7:
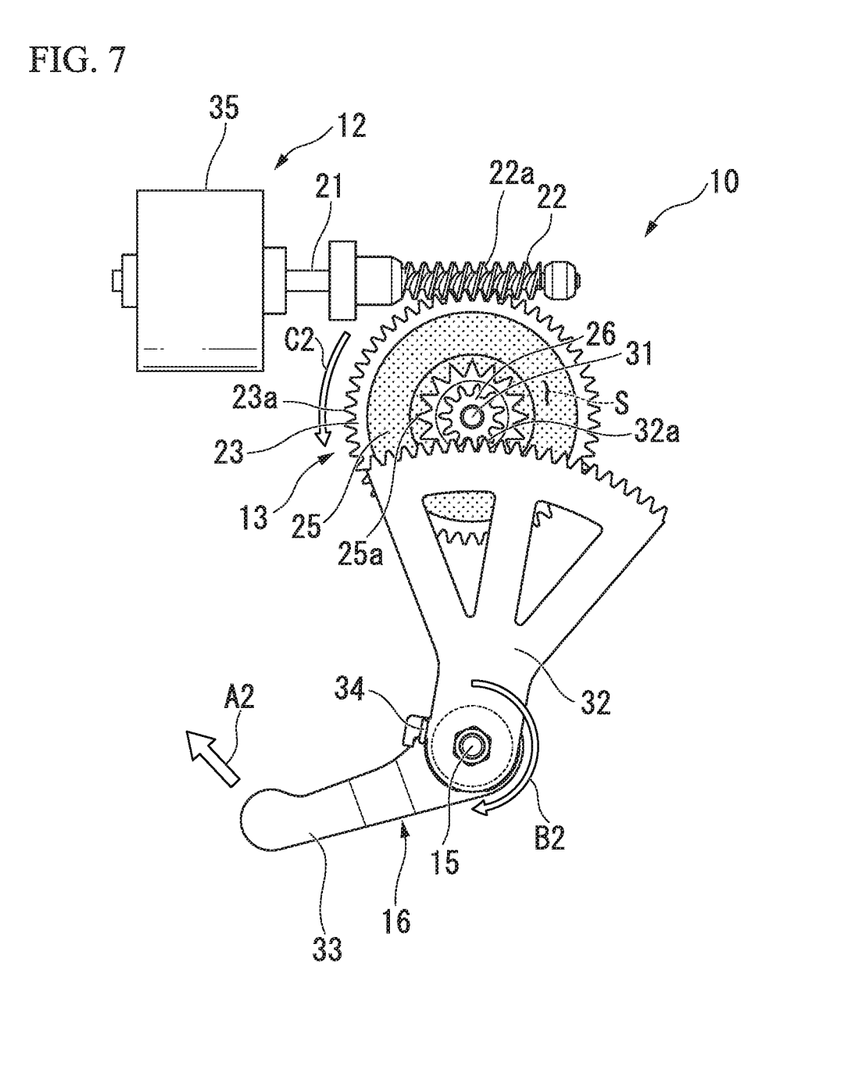
FIG. 7 is an explanatory diagram illustrating an action when the operation pedal is returned and is a view corresponding to FIG. 2.

FIG. 7 is an explanatory diagram illustrating an action when the operation pedal 4 is returned and is a view corresponding to FIG. 2.

As illustrated in FIG. 7, when a depression force of the driver with respect to the operation pedal 4 (the pedal portion 6) is suddenly released from a state in which the operation pedal 4 is depressed, the operation pedal 4 is intended to be returned to the initial position (in the return direction A2) by the restoring force of the return spring which is not illustrated. Then, the reaction force output part 16 receives the biasing force of the coil spring 34, follows a return motion of the operation pedal 4, and thus rotates toward the initial position (in the return direction B2). Here, when the motor 12 is stopped and the reaction force output part 16 is returned to the initial position by the coil spring 34, the clutch mechanism CM allows the worm wheel 23 and the pinion gear 25 to be in the disconnected state, and thus the transmission of the rotational force between the worm wheel 23 and the pinion gear 25 is interrupted. Accordingly, only the pinion gear 25 rotates (idles) with respect to the worm wheel 23. Therefore, the reaction force output part 16 rotates in the return direction B2 without being affected by rotational friction of the motor 12 and follows the return motion of the operation pedal 4.

Figure 8:
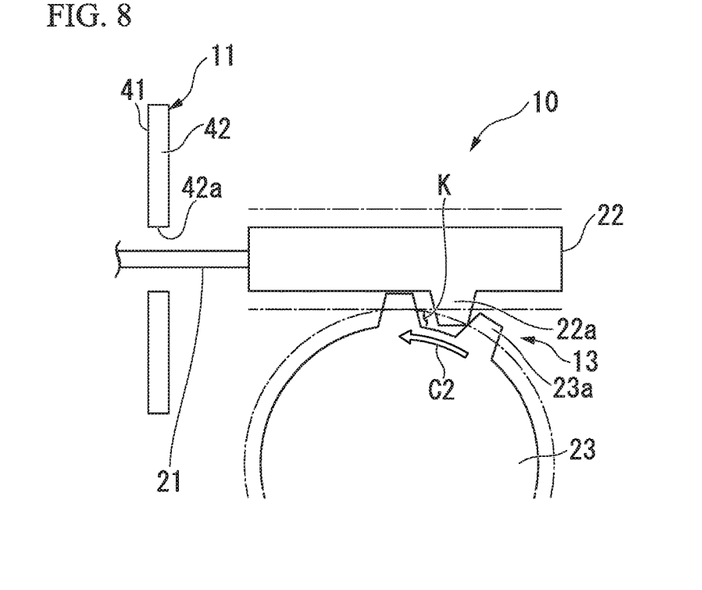
FIG. 8 is an explanatory diagram illustrating the action when the operation pedal is returned and is a view illustrating a worm and a worm wheel.

FIG. 8 is an explanatory diagram illustrating the action when the operation pedal 4 is returned and is a view illustrating the worm 22 and the worm wheel 23.

As illustrated in FIG. 8, in the accelerator pedal apparatus 1, when the pinion gear 25 idles while the pedal is returned as described above, the worm wheel 23 may also rotate slightly in the return direction C2. In this case, in the engagement portions of the worm 22 and the worm wheel 23, the backlash K may be formed on the feed side of the worm 22.

Figure 9:
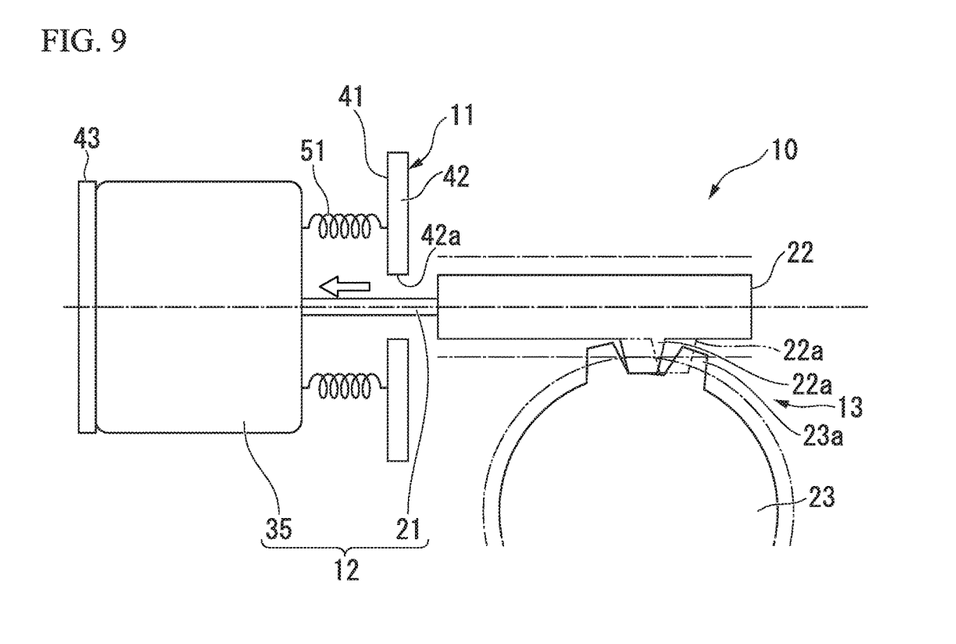
FIG. 9 is an explanatory diagram illustrating the action when the operation pedal is returned and is a view corresponding to FIG. 3.

FIG. 9 is an explanatory diagram illustrating the action when the operation pedal 4 is returned and is a view corresponding to FIG. 3.

In the embodiment, since the biasing member 51 illustrated in FIG. 9 biases the motor 12 toward the feed side of the worm 22, the motor 12 follows the rotation of the worm wheel 23 in the return direction C2 and moves toward the feed side (the second restriction wall 43 side) of the worm 22. Accordingly, the backlash K formed on the feed side of the worm 22 is filled, and the tooth portions 22a and 23a at the engagement portions of the worm 22 and the worm wheel 23 are always in contact with each other. Further, since the motor case 35 is in contact with the second restriction wall 43, the movement of the motor 12 to the other end side in the rotating shaft direction is restricted.

Therefore, according to the embodiment, the backlash K can be prevented from being formed on the feed side of the worm 22 at the engagement portions of the worm 22 and the worm wheel 23 as described above.

Accordingly, since a contact state between the tooth portions 22a and 23a is maintained, it is possible to suppress the generation of the collision noise between the worm 22 and the worm wheel 23 when the worm wheel 23 rotates in the depression direction C1.

Furthermore, in the reaction force control, when the motor 12 is driven, the worm 22 and the worm wheel 23 are promptly engaged, and thus the responsiveness of the reaction force output device 10 can be improved.

Also, in the embodiment, since the deceleration mechanism 13 including the worm 22 and the worm wheel 23 is disposed between the motor 12 and the operation pedal 4, it is possible to realize a compact and thin size in the output shaft direction and a high reduction ratio as compared with a case in which a deceleration mechanism including, for example, a spur gear or the like is used.

Further, in the embodiment, since the clutch mechanism CM is provided between the pinion gear 25 and the worm wheel 23, it is not easily affected by the rotational friction on the motor 12 side when the motor 12 is stopped and the reaction force output part 16 is returned. Also, when the pedal is returned and the pinion gear 25 idles, it is possible to minimize a rotation amount of the worm wheel 23 in the return direction B2 (a rotation amount interlocked with the pinion gear 25), thereby suppressing the formation of the backlash K on the worm 22 side.

Furthermore, in the embodiment, since the biasing member 51 is interposed between the motor 12 and the housing 11, simplification can be achieved.

Although the embodiments of the present invention have been described above in detail with reference to the drawings, the specific constitution is not limited to the embodiments, and design changes or the like within the scope not departing from the gist of the present invention are also included.

For example, in the above-described embodiment, the case in which the power transmission device of the present invention is applied to the reaction force output device 10 has been described. However, various power transmission devices in which the driving force of the motor 12 is transmitted to the operation portion via the worm 22 and the worm wheel 23 can also be applied.

Also, in the above-described embodiment, the case in which the biasing member 51 is disposed on the worm 22 side (between the motor 12 and the housing 11) with respect to the engagement portions of the worm 22 and the worm wheel 23 has been described. However, the biasing member may be provided on at least one side of the worm wheel 23 side and the worm 22 side with respect to the engagement portions of the worm 22 and the worm wheel 23. In this case, as another embodiment in which the biasing member is provided on the worm 22 side, the biasing member may be interposed between the rotating shaft 21 and the worm 22. Also, the biasing member may be provided on both of the worm wheel 23 side and the worm 22 side.

Also, in the above-described embodiment, the case in which the coil spring is used as the biasing member 51 has been described, but it is not limited thereto. For example, a leaf spring or a plate material formed of an elastically deformable material or the like may be used. Further, the motor 12 may be floatingly supported in the housing 11 by a biasing member. In this case, vibration generated by the motor 12 is attenuated and absorbed by the biasing member to be suppressed from being transmitted to the housing 11 side.

Also, in the above-described embodiment, a constitution in which the clutch mechanism is in the connected state when the operation pedal 4 is depressed has been described, but it is not limited thereto. For example, the clutch mechanism may be in the connected state only when the motor is driven (when the reaction force is controlled) and may be in the disconnected state when the motor is stopped (when the operation pedal 4 is depressed and when the pedal is returned).

Even in this case, since the backlash K can be prevented from being formed on the feed side of the worm 22 when the pedal is returned, the generation of the collision noise can be suppressed, and the responsiveness can be improved.

Also, the clutch mechanism may not be provided.

In addition, it is possible to appropriately replace the elements in the above-described embodiment with well-known elements without departing from the spirit of the present invention.

REFERENCE SIGNS LIST

4 Operation pedal (operation portion)
10 Reaction force output device (power transmission device)
11 Housing
12 Motor
16 Reaction force output part (power transmission part)
21 Rotating shaft
22 Worm
23 Worm wheel
51 Biasing member

The invention claimed is:

1. A power transmission device which transmits power to an operation portion, comprising:
a motor having a motor case disposed in a housing,
a worm connected to a rotating shaft of the motor, and
a worm wheel engaged with the worm and disposed at an operation portion side with respect to the worm,
wherein a biasing member is disposed at the one side with respect to engagement portions of the worm and the worm wheel; said biasing member being operable to bias one side of a worm wheel side and a worm side in a direction in which the worm and the worm wheel come in contact with each other when the motor is driven;
wherein said housing comprises a first restriction wall located on one end side in a rotating shaft direction with respect the motor case, and a second restriction wall located on the other side in the rotating shaft direction with respect to the motor case;
wherein the biasing member is located between the first restriction wall and the motor case at a position spaced away from the worm such that one end of the biasing member is in direct contact with the first restriction wall and the other end of the biasing member is in direct contact with the motor case;
wherein the biasing member is separate from the motor; and
wherein the biasing member is arranged around the rotating shaft such that a gap is formed between periphery of the rotating shaft and the biasing member.

2. The power transmission device according to claim 1, further comprising a power transmission part disposed between the worm wheel and the operation portion to bias the operation portion toward an initial position, and
a clutch mechanism configured to allow the worm wheel and the power transmission part to be in a connected state when the motor is driven and also to allow the worm wheel and the power transmission part to be in a disconnected state when the motor is stopped and the operation portion is returned by a biasing force of the power transmission part.

3. The power transmission device according to claim 1, wherein the biasing member is interposed between the motor case and the housing in which the motor is accommodated such that the motor case is separated from the first restriction wall by the biasing member.

4. The power transmission device according to claim 1, wherein the biasing member biases the worm in a longitudinal direction of the worm such that tooth portions of the worm and worm wheel are in contact and a backlash in the engagement portions is filled.

* * * * *